United States Patent [19]

Krohe et al.

[11] 3,744,966
[45] July 10, 1973

[54] SINGLE-CHAMBER KILN WITH COMBUSTION GAS CIRCULATION

[75] Inventors: Wilfried Krohe, Niederhochstadt; Berthold Rösch, Frankfurt-Schwanheim, both of Germany

[73] Assignee: Sigri Elektrographit GmbH, Meitingen near Augsburg, Germany

[22] Filed: May 26, 1971

[21] Appl. No.: 146,890

[30] Foreign Application Priority Data
June 18, 1971  Germany.................. P 20 29 840.2

[52] U.S. Cl.......... 432/176, 432/6, 432/145, 432/146
[51] Int. Cl................................................ F27b 3/02
[58] Field of Search................................ 263/28, 43

[56] References Cited
UNITED STATES PATENTS
3,172,647  3/1965  Remmey............................ 263/28
2,191,438  2/1940  Breeler................................ 263/28
2,849,221  8/1958  Cone et al. ......................... 263/43

FOREIGN PATENTS OR APPLICATIONS
812,271  4/1959  Great Britain....................... 263/28

Primary Examiner—John J. Camby
Attorney—Curt M. Avery, Arthur E. Wilfond, Herbert L. Lerner and Daniel J. Tick

[57] ABSTRACT

A single chamber kiln for firing ceramic bodies, such as molded carbon bodies and the like, with combustion gas, includes a kiln having side walls and defining a chamber for receiving the ceramic bodies. Hydrocarbon fuel burners are arranged in the walls in a first plane for supplying the combustion gas to the chamber and gas outlets are disposed in the walls and directed into the chamber. Substantially vertical passages join the outlets and blowers are arranged in the walls at a second plane and communicate with these passages for moving combustion gas therethrough to circulate the same through the chamber.

8 Claims, 5 Drawing Figures

Patented July 10, 1973                    3,744,966

SINGLE-CHAMBER KILN WITH COMBUSTION GAS CIRCULATION

Our invention relates to a single-chamber kiln with combustion gas circulation for firing ceramic bodies, particularly molded carbon bodies. The kiln is equipped with gas or oil burners, blowers for circulating combustion gases and ceramic or metallic firing containers.

In general, ceramic materials can be shaped only in the plastic condition which is adjusted by the addition of plasticizers or by suitable preconditioning. The bodies produced by pressing, casting or other forming methods are soft and have little stability and in order to attain sufficient strength must be heated to an elevated temperature to evaporate or dissociate the plasticizer. The strength is moreover increased by temperature-induced phase changes and sintering processes.

Starting materials for molded carbon bodies are ground coke, graphite or carbon black, which are mixed with a binder that serves at the same time as plasticizer, such as coal-tar pitch, tar or synthetic resin, and if desired additions of oils which reduce the forming resistance. The plastic material is formed in extrusion, screw-type injection or die presses or also by shaking or tamping and is subsequently heated to temperatures of up to about 1,200°C in order to convert the binder into solid coke. In this process, substantial amounts of gas and correspondingly high pressures are generated in the molded bodies through the dissociation of volatile substances from the binder materials. If the internal pressure exceeds the strength of the body, fissures are formed through which the gas is directed to the outside. The destruction of molded bodies can be avoided if equilibrium exists below a critical pressure limit between the gas quantity newly generated per unit of time and the gas quantity led off by diffusion.

The coke produced in the heating of the molded bodies also is not stable but is subject to ordering processes connected with a reduction of volume. These ordering processes induce tensile stresses, the magnitude of which is proportional to the maximum temperature difference in the body. These stresses are also a frequent cause for smaller or larger cracks which can preclude economic use of the molded bodies.

Firing of carbon bodies without rejects is possible only if critical heating speeds which depend on quality, shape and critical temperature differences within the bodies are not exceeded. These conditions are only approximately met in the ring chamber kilns which are preferably used for the firing of molded carbon bodies. Because of the manner in which the flame is directed, substantial temperature differences occur within a container charge, and furthermore, temperature jumps cannot be avoided in charging the firing chamber.

It has therefore been proposed to fire molded bodies which are sensitive to firing and especially those of large size, in single-chamber kilns with combustion gas circulation, the temperature of which can be controlled independently of preceding or following chambers. The known single-chamber kilns with combustion gas circulation are heated by burners arranged in the longitudinal or end surfaces of the kiln chamber and the combustion gases are circulated by blowers in the kiln ceiling with a mutual spacing of about 3 meters, or by blowers arranged in the lateral oven walls. Firing containers which contain the molded bodies to be fired are placed in the kiln chamber.

With the commonly used, mean heating-up speed of about 60 to 100°C per day, non-uniform combustion gas velocity in the kiln chamber results from the known arrangement of burners and blowers, especially between the firing containers and correspondingly different heat transfer coefficients.

Temperature differences in the vertical direction of about 20° to 30°C and of about 10° to 30°C in the horizontal direction are generated thereby in the firing containers, and for larger shapes the firing reject rate is 3 to 10 percent. A further disadvantage of the known kilns is that with the blowers arranged in the kiln ceiling, the space below the blowers cannot be filled with firing containers, so that only 80 to 85 percent of the floor area can be utilized.

Finally, the failure of one of the available two or three blowers will introduce a symmetrical temperature distribution in the kiln chamber and lead to a higher firing reject rate.

Accordingly, it is an object of our invention to provide a single-chamber kiln that avoids the disadvantages of the known single-chamber kiln with combustion gas circulation.

It is another object of our invention to provide a single-chamber kiln with combustion gas circulation for firing firing-sensitive molded bodies without rejects. Subsidiary to this object it is an object of our invention to provide a single-chamber kiln with combustion gas circulation wherein the commonly used heating-up speeds and a small vertical temperature difference in the firing containers during the entire travel through kiln are not exceeded.

According to a feature of the invention, the foregoing objects are realized by arranging in the longitudinal walls of the kiln chamber, burners and injection holes in one plane, and in another plane, blowers at a mutual spacing of at most 1.5 meters. In addition, vertical combustion gas shafts are provided between the blowers and the injection holes.

According to another feature of the invention, the distance between the plane of the burners and the plane of the intake openings of the circulation blowers is greater than the height of the firing containers, the plane of the burners being above the upper boundary plane of the firing containers and the plane of the intake openings of the circulation blowers below the lower boundary plane of the firing containers. According to the invention it is advantageous to arrange firing containers of circular cross section in a quadrilateral array in the kiln chamber, so that approximately 25 percent of the floor area is available for the circulation of the combustion gases and that the combustion gases are conducted through geometrically identical channels.

According to a further feature of the invention, it is advantageous to connect the vertical combustion gas shafts which start at the blowers with gas collecting ducts or plenums built into the kiln ceiling. For a better distribution of the combustion gas flow to the injection openings and the plenum suitable slide dampers can be arranged in the plenum.

The advantages achieved with the single-chamber kiln with combustion gas circulation according to the invention consist particularly in the feature that in firing of large-size molded bodies of qualities sensitive to firing no fissures or other faults occur at the usual heating-up and cooling speed which might degrade the properties of the molded bodies so that rejects which up to now have been unavoidable can be practically eliminated. Further advantages of the kiln according to the invention are high thermal efficiency and the low sensitivity against the failure of individual circulation blowers and/or individual burners.

Single-chamber kilns with combustion gas circulation are made equipped with a fixed floor and removable, integral or multisectional kiln ceiling, and with a fixed ceiling and movable floor.

The invention will now be described with reference to the drawing wherein.

Figure 1:
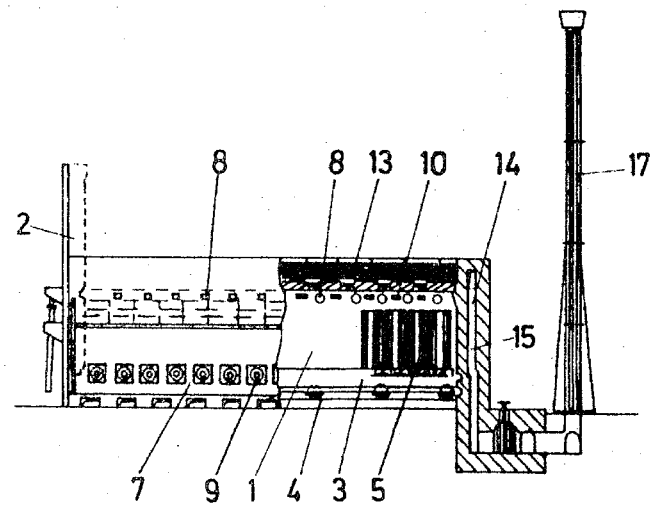
FIG. 1 is a lateral view, partially in section, of a single-chamber kiln according to the invention depicted as a car kiln in which firing containers are arranged on a car which is guided by tracks built into the kiln floor.
Figure 2:
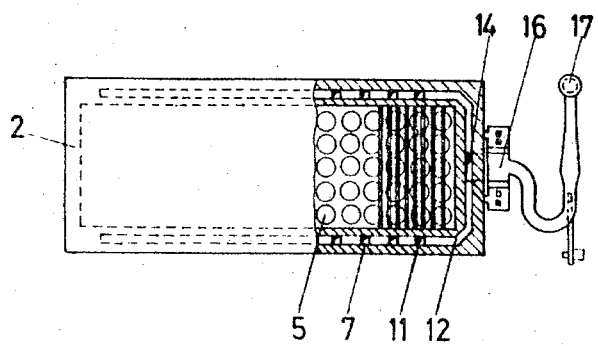
FIG. 2 is a plan view of the single-chamber kiln of FIG. 1.
Figure 3:
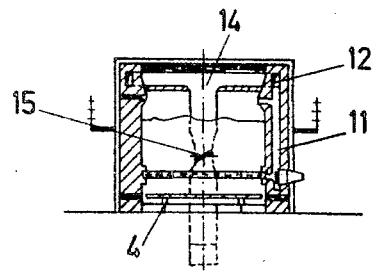
FIG. 3 is a cross section of the kilns of FIG. 1
Figure 4:
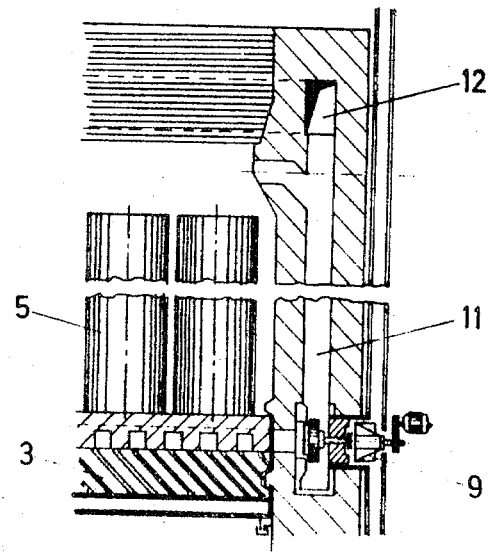
Figure 5:
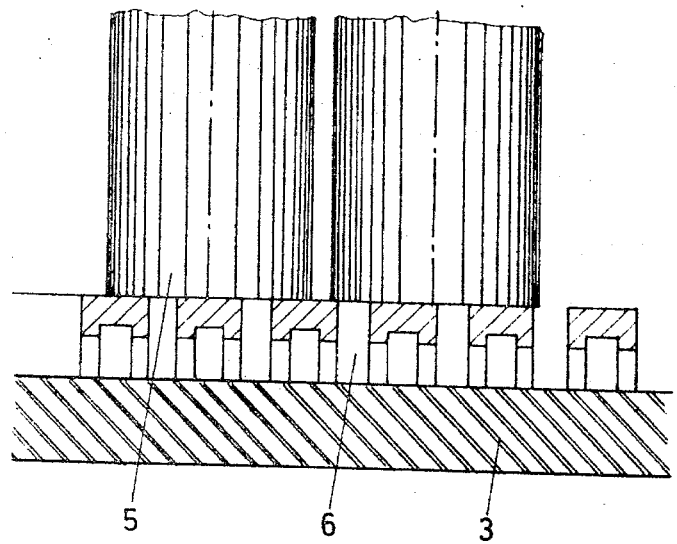

FIG. 4, a detail from FIG. 3; and,

FIG. 5, a detail from FIG. 1.

Reference numeral 1 designates the kiln chamber which is equipped at the end face with the vertical-lift door 2. A car 3 is guided by tracks 4 on which containers 5 of sheet steel are arranged in a quadrilateral pattern. The car floor consists of refractory ceramic material and is loaded with the containers 5. The car floor has a multiplicity of slots 6 (FIG. 5) arranged transversely to the longitudinal axis of the car. In the side wall 7 of the kiln chamber 1 are arranged oil-fired burners 8 and blowers 9 in two planes respectively. The burners and blowers are mutually spaced at 1.3 meters center-to-center respectively. If desired, the blowers and burners can be respectively mutually spaced up to 1.5 meters center-to-center. This is the largest spacing permissible since a greater spacing would result in too great a vertical temperature difference in the firing container. The diameter of a blower is about 0.5 meter.

In the burner plane between each two burners are provided injection openings 10 for the circulated gas. The injection openings 10 are connected with the blowers 9 by vertical combustion gas shafts 11 which open into a plenum 12 in the kiln ceiling 13. The plenum 12 ends in the shaft 14 which has a control gate 15 and which leads to the stack 17 via the post-combustion space 16.

After the car loaded with containers is run into the kiln and the vertical-lift door is closed, the burners are ignited, from which combustion gas of temperature T1 flows past the containers 5 through the slots 6 in the car door to the blowers 9. The vertically descending flow of the hot circulating gases which due to the pattern arrangement of the containers is divided into many channels and which transfer a part of their heat content to the containers, assures automatically a homogeneous temperature distribution in the planes parallel to the burner plane. The drawn-off combustion gas is then pushed by the blowers 9 into the combustion gas shafts 11 and from there for the most part into the kiln chamber 1 via the injection openings 10. By admixing hot combustion gas, the temperature of the circulating gas is increased to the desired temperature T2 according to the heating program. By changing the ratio of the circulated gas quantity to the newly supplied combustion gas the vertical temperature difference in the kiln chamber can be controlled and in particular, can be made as small as desired.

A gas quantity corresponding to the newly supplied combustion gas is drawn off by the plenum 12 and gets to the stack 17 via the post-combustion space 16. Post-combustion is provided if the combustion gases contain olfactory or other detrimental impurities.

In the firing of cylindrical carbon molded bodies with a diameter of 0.6 m and a height of 2.5 m in a car kiln according to the invention maximum vertical temperature differences of 10° to 15°C and horizontal temperature differences of 5° to 8°C were measured. The firing reject rate was 1 to 3 percent.

The single-chamber kiln according to the invention does not permit the commonly used heating-up speeds to be exceeded. The single chamber kiln of the invention also does not permit the small vertical temperature difference in the firing containers to be exceeded during the entire travel through the kiln which is necessary to obtain a firing of firing sensitive molded bodies without rejects.

While the invention has been described by means of a specific example and in a specific embodiment, we do not wish to be be limited thereto for obvious modifications will occur to those skilled in the art without departing from the spirit and scope of the invention.

We claim:

1. A single-chamber kiln for firing ceramic bodies such as molded carbon bodies and the like, comprising a kiln having side walls and defining a chamber for receiving the ceramic bodies, a plurality of spaced burner means arranged in said walls in a first generally horizontal plane, a plurality of gas injection ports disposed in said walls, each of said ports arranged between adjacent burner means, a plurality of suction ports disposed in said walls at a second generally horizontal plane disposed below said first plane, fans arranged in each of said suction ports, and substantially vertical passages disposed in said side walls connecting each of said suction ports with one injection port, whereby said fans pass the combustion gas from said suction ports through said vertical passages to said injection ports to circulate the combustion gas through said chamber.

2. A single-chamber kiln according to claim 1, wherein said second generally horizontal plane is disposed below said ceramic bodies and said first generally horizontal plane is disposed above said ceramic body.

3. A single-chamber kiln according to claim 1 for firing ceramic material contained in ceramic or steel containers placed in said chamber, said burner means comprising a plurality of burners mutually spaced at intervals of at most 1.5 meters center-to-center and said blower means comprising a plurality of blowers mutually spaced at intervals of at most 1.5 meters center-to-center.

4. In a single-chamber kiln according to claim 3, the distance between said first plane and said second plane being greater than the height of said containers.

5. In a single-chamber kiln according to claim 3, said containers each having a circular cross-section and being grouped together and placed in said chamber so that the periphery of the group outlines a quadrilateral.

6. A single-chamber kiln according to claim 3 comprising a conveyance for moving said containers into and out of said chamber.

7. A single-chamber kiln according to claim 1, comprising plenum means arranged above said injection ports, said passages extending upwardly beyond said injection ports and communicating with said plenum means for removing a portion of the circulating combustion gas.

8. A single-chamber kiln according to claim 1, comprising an exhaust duct connected with said plenum means, and a control gate disposed in said duct.

* * * * *